(12) United States Patent
Shinohara et al.

(10) Patent No.: US 7,048,376 B2
(45) Date of Patent: May 23, 2006

(54) PROGRESSIVE ADDITION POWER LENS

(75) Inventors: Toshihide Shinohara, Chino (JP); Tadashi Kaga, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/733,843

(22) Filed: Dec. 12, 2003

(65) Prior Publication Data

US 2004/0189932 A1    Sep. 30, 2004

(30) Foreign Application Priority Data

Dec. 12, 2002    (JP) .............................. 2002-360987

(51) Int. Cl.
*G02C 7/06*    (2006.01)

(52) U.S. Cl. .................................................... 351/169
(58) Field of Classification Search ................ 351/159, 351/161, 164, 168, 169
See application file for complete search history.

(56) References Cited

U.S. PATENT DOCUMENTS

| | | | |
|---|---|---|---|
| 4,762,408 A * | 8/1988 | Shinohara | 351/169 |
| 4,786,160 A * | 11/1988 | Furter | 351/169 |
| 6,354,704 B1 * | 3/2002 | Yamamoto | 351/169 |

FOREIGN PATENT DOCUMENTS

| | | |
|---|---|---|
| EP | 0 384 128 A | 8/1990 |
| JP | 02-248920 A | 10/1990 |
| JP | 06-090368 B2 | 11/1994 |
| JP | 08-211340 | 8/1996 |
| JP | 9-49991 A | 2/1997 |
| JP | 09-251143 A | 9/1997 |
| JP | 10-123467 A | 5/1998 |
| JP | 10-123468 A | 5/1998 |
| JP | 10-123469 A | 5/1998 |
| JP | 2861892 B2 | 12/1998 |

* cited by examiner

*Primary Examiner*—Jordan M. Schwartz
*Assistant Examiner*—Jessica Stultz
(74) *Attorney, Agent, or Firm*—Sughrue Mion, PLLC

(57) ABSTRACT

A progressive addition power lens with a length of the intermediate corridor in the range of 22 to 28 mm, and a clear visual region, which is defined as a region where astigmatism is 0.5 diopters or less, has a horizontally maximum width thereof in the distant dioptric power region, which is twice as thick as or less than a horizontally minimum width in the intermediate corridor. Furthermore, the clear visual region defined as a region where astigmatism is 0.5 diopters or less has a width of 30 mm or more horizontally in the near dioptric power region. In addition, a position, where astigmatism distributed at the sides of the lens has the maximum value, is located in an almost horizontal direction with a far point positioned above the intermediate corridor or is located above the far point.

12 Claims, 5 Drawing Sheets

RELATED ART  RELATED ART

PROGRESSIVE ADDITION POWER LENS

BACKGROUND OF THE INVENTION

1. Field of the Invention

The present invention is related to a progressive addition power lens which is used for close-range work such as personal computer work, bookkeeping, reading, etc., and is mainly used for patients having poor focusing ability due to presbyopia.

2. Description of the Related Art

First, a general structure of a progressive addition power lens will be described. FIG. 5 is a view showing the general structure of a progressive addition power lens. FIG. 5A shows the entire structure thereof and FIG. 5B shows the variation in refractive power on the principal meridian curve. The progressive addition power lens has an aspheric shape, which is called a progressive refractive power surface (hereinafter, referred to as a progressive surface), on any one of a pair of refractive surfaces forming a lens (conventionally, the eye side is called an inner surface and the opposite side thereof is called an outer surface).

The progressive surface includes a far portion or far dioptric power region (F) having refractive power corresponding to a distant view, a near portion or near dioptric power region (N) having refractive power corresponding to a near view, and an intermediate portion (I) having a refractive power halfway between them and connecting the far portion and the near portion. It is difficult to clearly distinguish their borders because the progressive addition power lens is continuous from the distant view to the near view and has no border, and is intentionally designed so that a wearer feels as if he is wearing normal correction glasses for ametropia such as farsightedness, nearsightedness, etc.

The principal meridian curve (M) is provided on the progressive surface on the assumption that movement of the wearer's eyes ranges from the distant view to the near view. The lens is designed so that the wearer can move his or her eyes from a distant point in front to the very front (close range) along the principal meridian curve (M) and see an object situated at each distance. Generally, the principal meridian curve (M) is designed to be almost perpendicular to the lens wearing state and to be angled to the nose in consideration of eye movement around the near portion (N). As shown in FIG. 5B, on the principal meridian curve, refractive power is set to be uniform in the far portion (F), gradually increase in the intermediate portion, and be almost or substantially uniform in the near portion again.

In general, a border between the far portion and the intermediate portion of the principal meridian curve, i.e., an inflection point in which refractive power starts to increase, is called a distant point or far point (FP), and a border between the near portion and the intermediate portion, i.e., an inflection point in which refractive power is substantially constant again, is called a near point (NP). The near point may be said to be at the top of the near dioptric power region, and the far point may be said to be at the bottom of the far dioptric power region. Desired refractive power variation is generated in a section which ranges from the far point to the near point, and thus this section is called a intermediate corridor.

The other surface of the progressive addition power lens, which is not a progressive surface, is formed so as to have a spherical surface or an aspheric surface for correcting astigmatism in order to provide the wearer with prescription dioptric power in cooperation with the progressive surface.

The far portion (F) of the progressive surface has a constant curvature radius suitable for providing distance dioptric power, and the near portion (N) has an almost constant curvature radius suitable for providing near dioptric power, which is different from that of the far portion. The intermediate portion (I), which smoothly connects the two portions having different curvature radii, has an inevitably complex aspheric surface, which causes the resulting unique optical characteristics of the progressive addition power lens. That is, because astigmatism occurs on the sides of the intermediate portion (I), vision through the sides is blurred. Furthermore, a distorted aberration is generated, and an object is seen to be blurry and distorted, when moving the head.

It will be understood that a part of any region where the level of astigmatism is not more than 0.5 diopters (hereinafter, "diopters" is replaced by "D") will be referred to as a clear visual part of that region (or, more simply, as a clear visual region). When looking through a clear visual region, images seen are usually not blurry. Thus, one goal among others, in designing a progressive addition power lens, is to minimize the inevitable astigmatism and to optimize the distribution of the astigmatism in use (i.e., similar to the distorted aberration). It will be understood that regions of astigmatism have points of peak astigmatism (see the aberration distribution shown in FIG. 4A, for example, where such points are indicated by an "x"). These may be referred to as astigmatism peaks.

There are various types of progressive addition power lens. In one design, the progressive addition power lens has a far portion having a relatively broad region and a near portion having a region relatively narrower than the far portion, and the length of the intermediate corridor is about twelve millimeters. This design may be referred to as a far and near type design.

In the far and near type lens design, there is a disadvantage in that the clear visual region of the intermediate portion (I) inevitably is narrow. As a result, in some cases, the dioptric power of the far portion is prescribed to conform to the intermediate length in order to make an intermediate distance appear clear, but because most of the distant view is completely sacrificed, it is impossible to obtain satisfactory vision.

Another lens design is the so-called intermediate-near type or near-intermediate type of lens. One example of this design is described in a Examined Patent Application Publication No. 6-90368, in which the length of the intermediate corridor is set in the range of 20 to 25 mm, and the clear visual region of the intermediate portion is thereby broadened. In this type of lens design, however, it is difficult to use the distant dioptric power portion. This lens design ensures that the distant dioptric power portion is as small as possible and the visual sensation from the intermediate distance to near distance is regarded as being important. In another publication, Japanese Unexamined Patent Application Publication No. 9-49991, a progressive refractive power band which is limited to be within 18 mm was proposed.

Similarly, in other publications (see for example, Japanese Unexamined Patent Application Publication Nos. 2-24892, 9-251143, 10-123467, 10-123468 and 10-123469), a progressive addition power lens was devised in which further priority was given to the near view. In general, this type is called a near-and-near type, and a basic structure thereof includes a far portion, an intermediate portion, and a near portion. However, it is designed based on the idea that a prescription is prescribed based on the near dioptric power of the wearer and the dioptric power is gradually decreased to a distant point.

Furthermore, in the region corresponding to the distant portion, the wearer can see only a range from tens of centimeters to one or two meters because the dioptric power does not reach his/her distant dioptric power. But, because a clear visual region of a near point is set to be broad, for close-range work, the near-and-near type can be more conveniently used than the distant and near type or the intermediate and near type described above.

When such intermediate-and-near type and near-and-near type progressive addition power lenses are fitted in a frame of glasses, the eye point (EP, a position through which the eyes view through the lens in the case of the horizontal front view), is set in a intermediate corridor of the intermediate portion. This is much different compared with the eye point of the conventional distant and near type progressive addition power lens, which is set to a distant point or set to 2 to 4 mm upward from the far point. In an intermediate and near type and a near-and-near type lens, the eye point is set in the intermediate corridor, such that distant objects can be seen when the eye is opened upward and the focal point is set to be near when looking down.

As shown for example in Japanese Unexamined Patent Application Publication No. 2-248920, the near-and-near type progressive addition power lens is not particularly limited to the near-and-near type. The lens described in the above-identified publication has a far portion and a near portion, which are set to be extremely small. In addition, the dioptric power of the region between these portions changes gradually, and astigmatism is distributed. In this lens, the distance between the poles (i.e., length of a intermediate corridor) is 43.03 mm. That is, the poles are far apart from each other. Therefore, in the aberration distribution, preferably, a clear visual region of a portion close to a near dioptric power is broader and the maximum peak of astigmatism on the sides of a space between both poles is less than the addition power (2 D). However, since the intermediate corridor is so long (in order to obtain a desired near dioptric power), it is impossible to use due to the required extensive eye rotation. Furthermore, in terms of the size of a frame of glasses currently used, it is impractical for the frame to be filled with only an intermediate portion.

In a progressive addition power lens of JPA 9-251143, a clear visual region of a near portion is set to be very broad. Furthermore, the length of the progressive addition power lens is suitably in the range of 15 to 19 mm. A far portion, which is a specific view distance correction region, is also set to be very broad. Accordingly, a clear visual region of an intermediate portion has a narrow width, and the center has a concave shape, and the visual field is limited when an object such as a personal computer is viewed at a distance of tens of centimeters to one meter. Thus, it is difficult to use. Because astigmatism and distorted aberration are concentrated on the sides of the intermediate portion having a large size in a frame of glasses, there is a problem of blurring at the sides and large distortion.

Furthermore, the astigmatism peaks are located in a position substantially horizontal to the far point (i.e., at substantially the same height), or in a vertically higher position (although off to the sides) with respect to the far point. Moreover, when the lens is fitted in a frame of glasses, the eye point is set to be located on the principal meridian curve of the intermediate corridor which is located 8 to 12 mm upward from the near point. As a result, it becomes possible to solve some of the problems of the conventional near-and-near type progressive addition power lens described above.

An aspect of the present invention provides a progressive addition power lens with a near dioptric power region located below at least one of a first and second refractive surface pair forming a lens, the at least one refractive surface having a progressive refractive power and a intermediate corridor extending in an almost vertical direction from a near point located above the near dioptric power region, with a gradually decreasing refractive power, wherein, the length of the intermediate corridor is in the range of 22 to 28 mm, and a clear visual region, which includes a distant dioptric power region located above the intermediate corridor and having a farther dioptric power than the near dioptric power region and which is defined as a region where astigmatism is 0.5 diopters or less, has a horizontally maximum width in the distant dioptric power region which is no more than twice as thick than a horizontally minimum width in the intermediate corridor.

In the progressive addition power lens according to an aspect of the present invention, the clear visual region, defined as a region where astigmatism is 0.5 diopters or less, has a width of 30 mm or more horizontally in the near dioptric power region.

In the progressive addition power lens according various aspects of the present invention, a position, where the astigmatism peaks at the sides of the lens are located in an almost horizontal direction of the far point (i.e., at Progressive addition power lenses discussed in JPA 10-123467, JPA 10-123468 and JPA 10-123469 have almost equal astigmatism distribution. It can be commonly said of all of these lenses that a clear visual region, which is called a specific view distance correction region, is set to be very broad. As such, astigmatism is distributed from an intermediate portion to a side direction of a near portion, and the astigmatism peaks are positioned on the sides of the near portion. In this case, because a clear visual region of the intermediate portion is very narrow and because a relatively greater astigmatism than the addition power (1.5 D) occurs at the side direction thereof, the visual field is limited when an object such as a personal computer is viewed at a distance of tens of centimeters to one meter. Thus, it is difficult to use. Furthermore, the astigmatism occurs in the side direction of the near portion, and thus a wearer has a limited side direction visual field, and a sense of incongruity.

All of the above mentioned publications are incorporated herein by reference for their helpful background information on previous attempts to achieve satisfactory lenses.

SUMMARY OF THE INVENTION

The invention has as an objective to solve one or more of the above described problems of the conventional near-and-near type progressive addition power lens, including the problems of comfortable use for personal computer work or other desk work, with reduced incongruity. According to one aspect of the invention, there is provided a progressive addition power lens wherein the maximum width, of a clear visual region of a far portion (i.e., a specific view distance correcting portion) which is not important in use, is set so as to be no more than twice as thick as the minimum clear visual region of the intermediate portion and, at the same time, the distance of the intermediate corridor is set to be in the range of 20 to 28 mm, and also the maximum width of a clear visual region of the near portion is set to 30 mm or more. substantially the same height) or above the far point (i.e., at positions higher than the far point, but still at the sides).

In the progressive addition power lens according to an aspect of the present invention, when the lens is fitted in a frame of glasses, an eye point of the lens is located on the intermediate corridor separated by 9 to 12 mm upward from a near point in the horizontal front view.

BRIEF DESCRIPTION OF THE DRAWINGS

In order to understand the invention and to see how it may be carried out in practice, illustrative, non-limiting embodiments will now be described, with reference to the accompanying drawings, in which:

FIG. 1A shows an aberration distribution and FIG. 1B shows a dioptric power variation on the principal meridian curve.

FIG. 4A illustrates an aberration distribution and FIG. 4B shows a dioptric power variation on the principal meridian curve.

FIG. 5A illustrates the general structure of the lens and FIG. 5B shows a refractive power variation on the principal meridian curve.

DETAILED DESCRIPTION OF THE INVENTION

The present invention will now be described in detail by describing illustrative, non-limiting embodiments thereof with reference to the accompanying drawings.

Figure 1A:
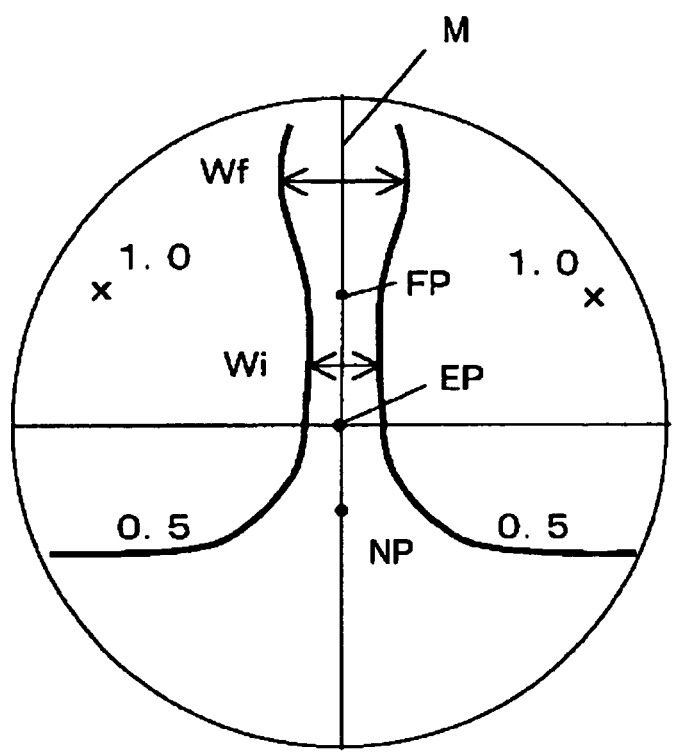
FIGS. 1A and 1B illustrate a non-limiting, exemplary embodiment of the present invention. Specifically, in accordance with an exemplary embodiment of the present invention.
Figure 1B:
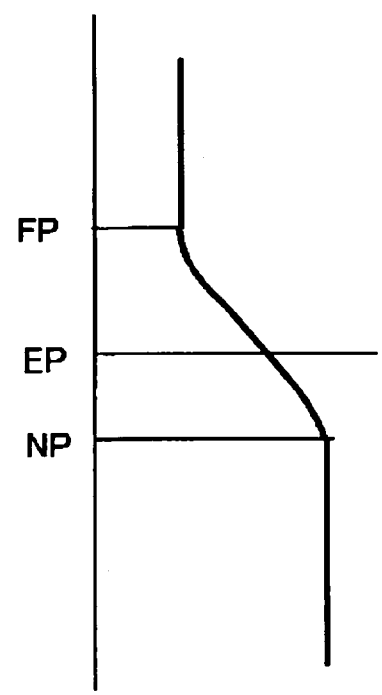

FIG. 1 shows an illustrative, non-limiting embodiment of the present invention. That is, FIG. 1A shows an aberration distribution and FIG. 1B shows a dioptric power variation on the principal meridian curve. In this embodiment, the decrease in refractive power in the range from the near point (NP) to the far point (FP) is 1.5 D.

Furthermore, the length of the intermediate corridor (length of NP–FP) is 25 mm. The maximum width (Wf) of the clear visual region of the far portion is not more than twice the minimum width (Wi) of the clear visual region of the intermediate portion (Wf is 14 mm and Wi is 7.5 mm in this specific embodiment). The clear visual region of the near portion is more than 60 mm wide, and extends to the left and right ends of the lens. The maximum astigmatism of the side portions is 1.0 D, and astigmatism peaks occur at side positions substantially horizontal to the far point (i.e., at substantially the same height as the FP). In addition, the eye point (EP) is at the geometric center of the lens on the principal meridian curve (M) and upward from the near point (in this embodiment, 10 mm above NP).

Figure 2:
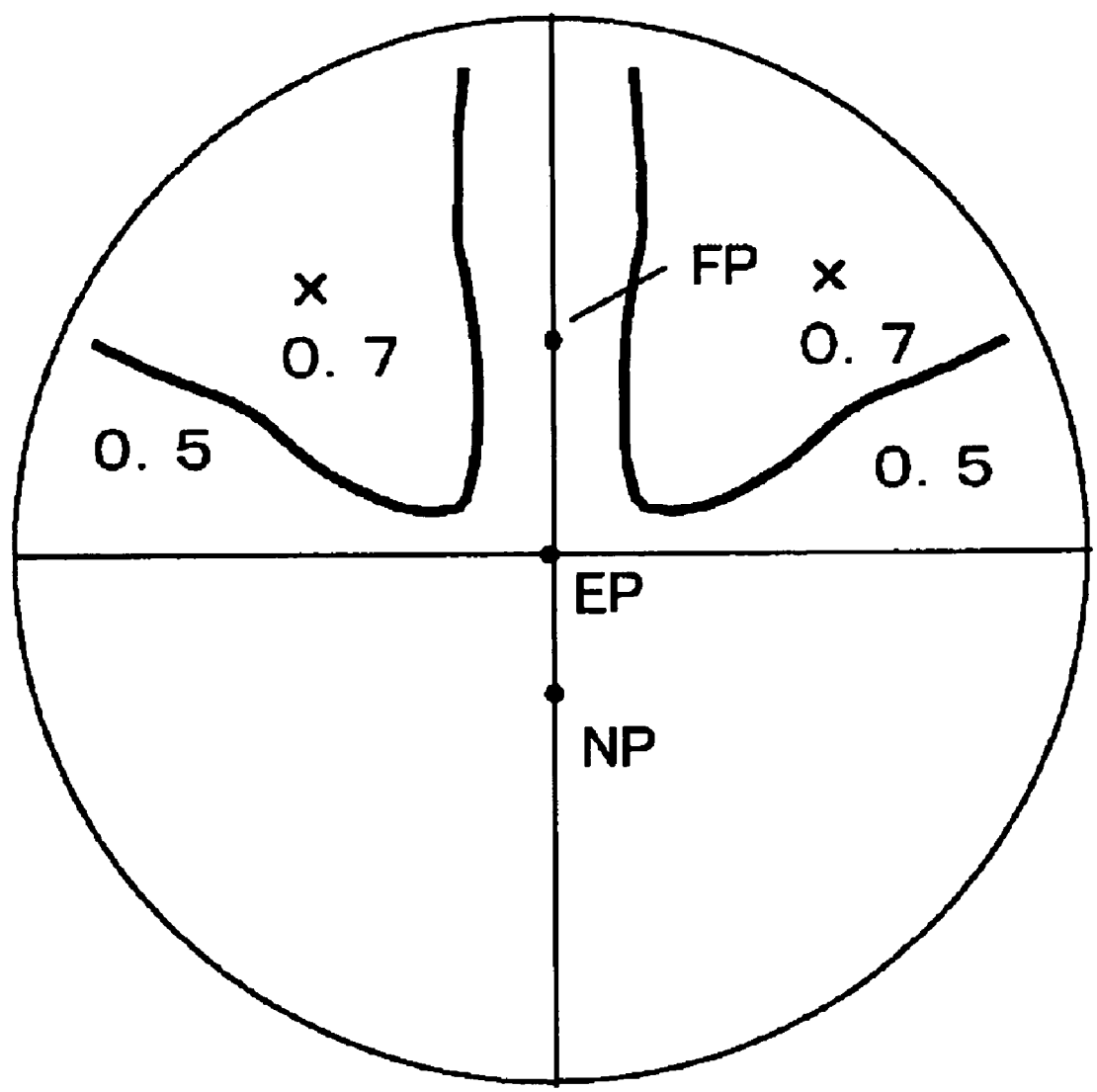
FIG. 2 illustrates an aberration distribution of a second, non-limiting, exemplary embodiment of the present invention.

FIG. 2 shows an aberration distribution of another illustrative embodiment of the present invention. In this embodiment, the decrease in refractive power in the range from the near point (NP) to the far point (FP) is 1.0 D. Furthermore, the length of the intermediate corridor (length of NP–FP) is 25 mm. The maximum width Wf of the clear visual region of the far portion is not more than 1.3 times the minimum width Wi of the clear visual region of the intermediate portion (in this specific example, Wf is 14 mm and Wi is 11 mm). The clear visual region of the near portion is more than 75 mm wide and extends to the left and right ends of the lens. The maximum astigmatism of the side portions is 0.7 D, and the astigmatism peaks are located at a position vertically higher and to the sides of the far point. In addition, the eye point (EP) is located at a geometric center of the lens, on the principal meridian curve (M) and 10 mm upward from the near point.

Figure 3:
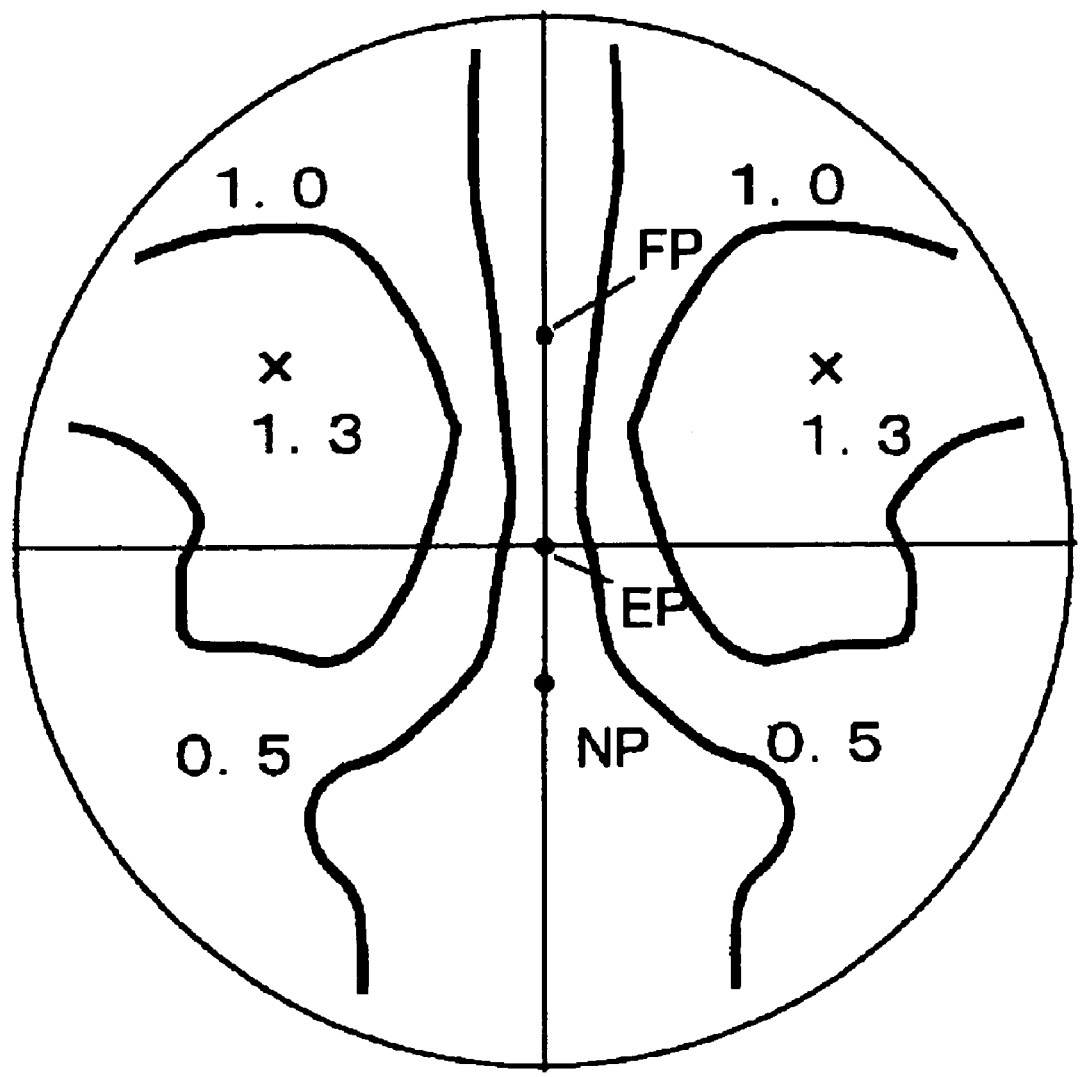
FIG. 3 shows an aberration distribution according to a third non-limiting, exemplary embodiment of the present invention.

FIG. 3 illustrates an aberration distribution of another exemplary embodiment of the present invention. In this embodiment, the decrease in refractive power in the range from the near point (NP) to the far point (FP) is 2.0 D. Furthermore, the length of the intermediate corridor (length of NP–FP) is 25 mm. The maximum width Wf of the clear visual region of the far portion is not more than 1.3 times the minimum width Wi of the clear visual region of the intermediate portion (in this specific example, Wf is 14 mm and Wi is 11 mm). The maximum clear visual region of the near portion is 30 mm. The maximum astigmatism of side portions is 1.3 D, and astigmatism peaks are located substantially horizontal with respect to the far point and to the sides thereof (i.e., at substantially the same height as the FP). In addition, the eye point (EP) is located at the geometric center of the lens, on the principal meridian curve (M) 10 mm upward from the near point.

Figure 4A:
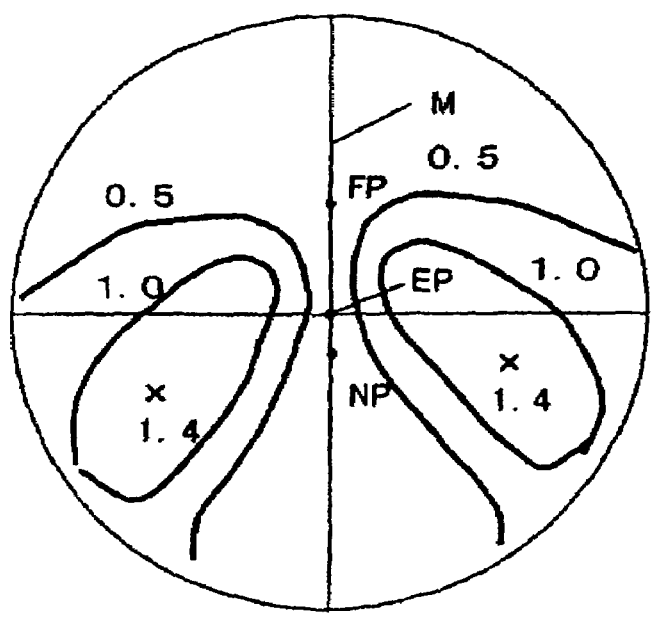
FIGS. 4A and 4B show conventional lens concepts. Specifically.
Figure 4B:
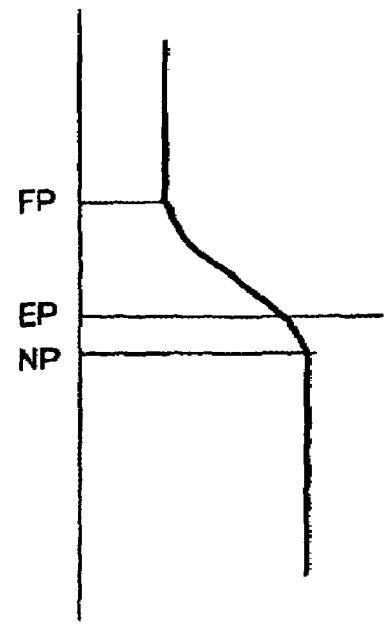
Figure 5A:
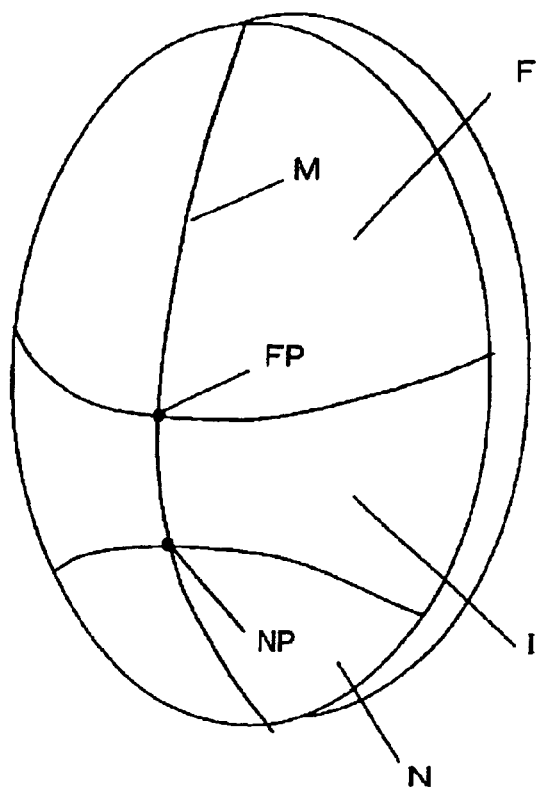
FIGS. 5A and 5B show a structure of a conventional progressive addition power lens. Specifically.
Figure 5B:
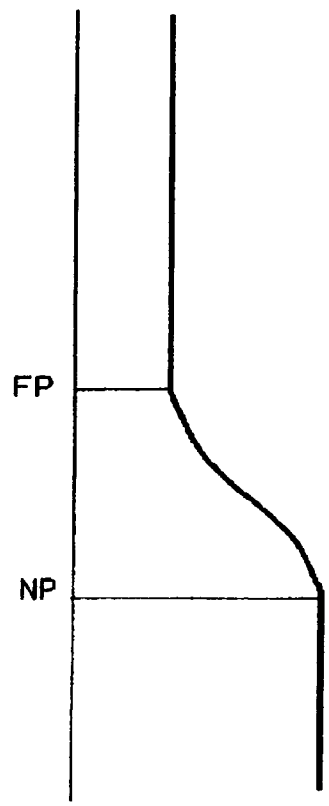

In the lenses shown in FIGS. 4A and 4B, the decrease in refractive power in the range from the near point (NP) to the far point (FP) is 1.5 D. Furthermore, the length of the intermediate corridor (length of NP–FP) is 19 mm. The maximum width Wf of the clear visual region of the far portion is 50 mm or more, and the minimum width Wi of the clear visual region of the intermediate portion is 6 mm. The clear visual region of the near portion is 35 mm or less. The maximum astigmatism of the side portions is 1.4 D, and the astigmatism peaks are located below the near point. In addition, the eye point (EP) is located at the geometric center of the lens, on the principal meridian curve (M) and 5 mm upward from the near point.

As is clear from comparing the example of FIGS. 4A and 4B with the exemplary embodiment shown in FIGS. 1A and 1B and described hereinabove, the length of the intermediate corridor in the embodiment is set sufficiently long so that the clear visual region of the intermediate portion can be broadened, and the clear visual field can be broadened in the region of the eye point, thus making it easier to view, for example, the monitor of a personal computer. Furthermore, the clear visual region of the near portion is set to be very broad.

On the other hand, the clear visual region of the far portion is set to be relatively narrow and is upward from the eye point. A lens according to the embodiment shown in FIGS. 1A and 1B may be inconvenient to use for viewing objects at a distance, but in a near-and-near type of a progressive addition power lens, most of the far portion is cut out anyways when being fitted in a glasses frame. Thus, no inconvenience exists for the main use of the lenses, namely, close-range work such as desk work.

In accordance with the embodiment shown in FIGS. 1A and 1B, because the astigmatism of the sides is controlled to be less than that of conventional lenses, and because the astigmatism peaks are located substantially horizontal with respect to the far point (i.e., at substantially the same height as the FP), there is no inconvenience when performing tasks such as desk work (which involves mainly using a downward view when reading the keyboard or documents from the front of a personal computer monitor and the like).

Another advantage of the embodiment of FIGS. 1A and 1B will now be pointed out. The eye point of the conventional lens of FIGS. 4A and 4B is about 5 mm upward from the near point. With such conventional lenses, when looking at nearby documents and the screen in turn, the user must move his neck up and down for adjustment. This is because the eye point to be used for looking at the screen is very close to the near point to be used for current work. However, in the embodiment of FIGS. 1A and 1B, the position of the eye point is set to be about 10 mm above the near point. This makes it possible to perform work in a natural manner, without the need to move the neck. The result is that fatigue is greatly reduced, even after an extended period of work.

The exemplary embodiments of the invention as depicted in FIGS. 2 and 3 possess similar advantages, as will be appreciated by one familiar with this field.

The embodiments of the invention have been provided to teach by example how to achieve a progressive addition power lens more suitable for desk work, such as personal computer work, than the conventional lens shown in FIGS. 4A and 4B. Variations beyond the concrete examples shown herein will occur to persons familiar with this field.

For example, although the progressive surface is described here as being one of an outer surface and an inner surface, the present invention is not limited to such a case and also includes a case where both outer and inner surfaces have a progressive aspheric element, and a desired progressive refractive power effect is achieved as a result of each of their properties.

The above and other features of the invention including various and novel features have been particularly described with reference to the accompanying drawings. It will be understood that the particular features of the refractive lens embodying the invention is shown by way of illustration only and not as a limitation of the invention. The principles and features of this invention may be employed in varied and numerous embodiments without departing from the scope of the invention, which should be ascertained from the appended claims.

There is claimed:

1. A progressive addition power lens comprising:
   a near dioptric power region, an intermediate corridor, and a far dioptric power region, each with a respective clear visual region having astigmatism of 0.5 diopters or less;
   wherein:
      the intermediate corridor extends vertically from the near dioptric power region to the far dioptric power region, with a gradually decreasing refractive power;
      a maximum horizontal width of the clear visual region in the far dioptric power region is no more than twice a minimum horizontal width of the clear visual region in the intermediate corridor;
      a vertical length of the intermediate corridor is in a range of 22 to 28 mm;
      a far point at the bottom of the far dioptric power region; and
      astigmatism peaks positioned only at same height or vertically higher than the far point.

2. A progressive addition power lens comprising:
   a near dioptric power region, an intermediate corridor, and a far dioptric power region, each with a respective clear visual region having astigmatism of 0.5 diopters or less; a near point at the top of the near dioptric power region; and
   an eye point in the intermediate corridor, at a position 9 to 12 mm higher than the near point,
   wherein:
      the intermediate corridor extends vertically from the near dioptric power region to the far dioptric power region, with a gradually decreasing refractive power,
      a maximum horizontal width of the clear visual region in the far dioptric power region is no more than twice a minimum horizontal width of the clear visual region in the intermediate corridor, and
      a vertical length of the intermediate corridor is in a range of 22 to 28 mm.

3. The progressive addition power lens as set forth in claim 1, wherein the clear visual region of the near dioptric power region has a horizontal width of 30 mm or more.

4. The progressive addition power lens as set forth in claim 3, wherein the astigmatism peaks are located to the sides of the far point.

5. The progressive addition power lens as set forth in claim 3, wherein the astigmatism peaks are located to the sides of the far point, with positions higher than the far point.

6. The progressive addition power lens as set forth in claim 1, wherein the astigmatism peaks are located to the sides of the far point.

7. A progressive addition power lens comprising:
   a near dioptric power region, an intermediate corridor, and a far dioptric power region, each with a respective clear visual region having astigmatism of 0.5 diopters or less;
   a far point at the bottom of the far dioptric power region; and
   astigmatism peaks located to the sides of the far point, positioned at substantially same height as the far point;
   a near point at the top of the near dioptric power region; and
   an eye point in the intermediate corridor, at a position 9 to 12 mm higher than the near point,
   wherein:
      the intermediate corridor extends vertically from the near dioptric power region to the far dioptric power region, with a gradually decreasing refractive power;
      a maximum horizontal width of the clear visual region in the far dioptric power region is no more than twice a minimum horizontal width of the clear visual region in the intermediate corridor; and
      a vertical length of the intermediate corridor is in a range of 22 to 28 mm.

8. The progressive addition power lens as set forth in claim 1, wherein the astigmatism peaks are located to the sides of the far point, with positions higher than the far point.

9. A progressive addition power lens comprising:
   a near dioptric power region, an intermediate corridor, and a far dioptric power region, each with a respective clear visual region having astigmatism of 0.5 diopters or less;
   a far point at the bottom of the far dioptric power region;
   astigmatism peaks located to the sides of the far point, with positions higher than the far point;
   a near point at the top of the near dioptric power region; and
   an eye point in the intermediate corridor, at a position 9 to 12 mm higher than the near point, wherein:
the intermediate corridor extends vertically from the near dioptric power region to the far dioptric power region, with a gradually decreasing refractive power;
a maximum horizontal width of the clear visual region in the far dioptric power region is no more than twice a minimum horizontal width of the clear visual region in the intermediate corridor; and
a vertical length of the intermediate corridor is in a range of 22 to 28 mm.

10. The progressive addition power lens as set forth in claim 9 wherein the clear visual region of the near dioptric power region has a horizontal width of 30 mm or more.

11. The progressive addition power lens as set forth in claim 5, further comprising:
a near point at the top of the near dioptric power region; and
an eye point in the intermediate corridor, at a position 9 to 12 mm higher than the near point.

12. A progressive power regions comprising;
a near dioptric power region, an intermediate corridor, and a far dioptric power region, each with a respective clear visual region having astigmatism of 0.5 diopters or less;
a far point at the bottom of the far dioptric power region; and
astigmatism peaks positioned at substantially same height or vertically higher than the far point;
wherein:
the intermediate corridor extends vertically from the near dioptric power region to the far dioptric power region, with at gradually decreasing refractive power;
a maximum horizontal width of the clear visual region in the far dioptric power region is no more than twice a minimum horizontal width of the clear visual region in the intermediate corridor;
a vertical length of the intermediate corridor is in a range of 22 to 28 mm, and the vertical length of the intermediate corridor is in a range of 24.5 to 25.5 mm.

* * * * *